United States Patent Office 2,732,309
Patented Jan. 24, 1956

2,732,309

PROCESS FOR THE PRODUCTION OF COLD WATER DISPERSIBLE STARCH PRODUCTS AND THE PRODUCTS THEREOF

Ralph W. Kerr, Riverside, Ill., assignor to Corn Products Refining Company, New York, N. Y., a corporation of New Jersey No Drawing. Application August 28, 1952,
Serial No. 306,964

22 Claims. (Cl. 106—213)

This invention relates to the production of modified starch products, and more particularly cold water dispersible starch products.

An object of this invention is to provide a process for the production of a starch product which is rapidly dispersible and highly soluble in cold water. A further object is the production of such products with a high rate of solution in cold water. Still a further object is the production of such products especially adapted for use as laundry starch. Another object is the production of such products, which, when employed in sizing operations, exhibit acceptable stiffening value, uniformity in size coating, relative freedom from water spotting on a fabric when the latter is sized, dried, and sprinkled with water, and the ability to create a smooth, flexible finish when a fabric sized therewith is ironed.

Various methods have been employed in the past in efforts to obtain satisfactory cold water dispersible and cold water soluble starch products. One method involves passing moist starch filter cake between heated rolls and grinding the dried, gelatinized product to a powder. However, this material disperses in cold water only with great difficulty, and even with prolonged stirring only about 5 to 10 percent of the material actually dissolves. More recently starch has been partially hydrolyzed with acid, and the converted starch gelatinized and dried by passing an aqueous slurry between heated rolls. This product also disperses in cold water only with great difficulty and less than 25 percent of the material eventually dissolves. Still more recently there has been obtained a starch suitable for use as a laundry size which disperses rapidly in cold water and rapidly dissolves therein to the extent of about 90 to 95 percent. This is accomplished by hydrolyzing the starch to a low viscosity level by means of an enzyme treatment, followed by completely gelatinizing and drying the converted starch on heated rolls. Such a process is the subject of a copending application, U. S. Serial No. 28,416, filed May 21, 1948, Patent No. 2,609,326. This product, however, although a vast improvement over previous products, is likewise not completely satisfactory, inasmuch as if it is converted sufficiently to obtain practically instantaneous dispersibility and high solubility, it causes water spots when fabrics are sized with it, then dried and sprinkled with water. When converted to a somewhat lesser degree, water spotting is not evident, but the rate of cold water dispersibility is adversely affected and the product contains an insoluble residue of such magnitude that the sizing obtained with it is uneven.

Thus, it is apparent that all cold water dispersible starch products heretofore produced lacked one or more of the several above-mentioned properties desirable in such a product.

The fluidities of the three types of products listed above are of the order of 1, 5 to 20, and 90, respectively, as determined by procedures to be described hereinafter. It would appear therefrom that in order to obtain a pregelatinized starch product which disperses instantly and dissolves practically completely in cold water at a rapid rate, it is necessary to convert starch to a fluidity level of about 90 in a uniform manner so that all molecules of the starch substance are of approximately equal size. However, as pointed out above, at this level of conversion, the pregelatinized starch product yields a size susceptible to water spotting.

It has now been discovered that starch converted to a fluidity level of about 90 and even considerably lower can be rendered almost completely soluble and also free from water spotting effect by etherification, gelatinization and drying.

It has further been discovered that such a modified partially etherified starch can be made instantly dispersible in cold water by addition of boric acid to the starch prior to drying.

Briefly stated, the process of the present invention comprises degradation of the starch, etherification, addition of boric acid, gelatinization, and drying. These steps need not be executed in the same order as listed above, but each of these steps is necessary and must be carried out under controlled conditions in order to obtain a final dried product significantly improved over products of the prior art in respect to one or more of the following characteristics:

1. Rate of dispersibility in cold water
2. Rate of solution
3. Degree of solubility
4. Ease of uniform application of the dispersions in sizing operations
5. Stiffening power
6. Freedom from water spotting Any type of starch, e. g. corn, wheat, grain sorghum, waxy maize, tapioca, etc., or mixtures thereof, may be employed in the process of this invention. However, the control of the various steps of the process, such as the extent of degradation and the degree of etherification, depends to some extent upon the type of starch used. Thus, less degradation and/or less etherification may be used when waxy maize starch or tapioca starch is employed than when corn starch is used. Such modifications, however, readily suggest themselves to one skilled in the art.

The degradation of the starch may be accomplished in any suitable manner. Appropriate procedures are well known in the art and include acid hydrolysis, enzyme hydrolysis, oxidation, and similar procedures commonly employed in the manufacture of thin-boiling starch. The degradation of the starch in many cases, such as by acid hydrolysis or oxidation, may be accomplished with or without gelatinization; when enzyme hydrolysis is employed, pregelatinization of the starch is preferred.

Because of the ease with which alkylene oxides react upon starch and the relatively low cost of these reagents, particularly ethylene and propylene oxides, they are the preferred etherifying agents. However, it is possible to employ other etherifying agents, e. g. dimethyl sulfate, commonly used in etherification of starch.

Any of the known catalysts for etherification of starch may be used for purposes of the present invention, e. g., inorganic and organic bases and salts. Examples of satisfactory catalysts are sodium hydroxide, sodium carbonate, lime, sodium chloride, triethanolamine, tetraethylammonium hydroxide, etc.

Residual, unreacted etherifying agent, catalyst and soluble, but deleterious by-products such as salts may be removed as by washing the starch with water on filters or centrifuges.

For reasons of economy it is preferable to gelatinize the starch with a minimum amount of water since the water must subsequently be evaporated during the drying step. The "Votator" may be employed for this purpose.

The "Votator" is functionally a heat exchange device of such design that it provides a high ratio of surface to volume, coupled with intense mixing or agitation, whereby viscous or paste type material may be quickly heated. Basically, the "Votator" consists of a jacketed heat transfer tube in which is provided a mechanically driven rotator of such dimension as to leave a relatively narrow annular space between the inside of the tube and the exterior of the rotator. The rotator is provided with a plurality of scraper blades and is adapted to be revolved at several hundred R. P. M. The heating medium is passed through the jacket on the heating tube countercurrent to the passage of the starch paste through the annular space therewithin. Only a small amount of the starch paste is in the "Votator" at any given time, and because of the high heat transfer surface coupled with the agitation and scraping effects provided by the scraping blades, the starch paste is brought up to the desired temperature in a relatively short period.

A number of United States patents have been issued which are directed to the "Votator" and various methods of using the same. Reference is made to United States Reissue Patent No. 22,519, reissued July 18, 1944, for a more detailed description of the construction and operation of the "Votator."

The "Votator," as used in our process, may be supplied with either water or steam as the heat transfer medium.

Although the "Votator" is particularly adapted for procuring the complete gelatinization required in this process, any other equipment or procedure which accomplishes complete dispersal of the starch substance may be employed in the gelatinization step. For example, a heated mixture of the starch and water may be pumped under high pressure through the feed orifice of the spray drier.

For drying the etherified starch paste, heated rolls are preferred, again chiefly for reasons of economy. It has been found that of the various types of roll driers available, double rolls give a final product of high bulk density and excellent dispersibility. In any event, regardless of the previous treatment, the starch should be in a completely gelatinized state immediately preceding the drying step, and the dispersed starch should be dried as rapidly as possible directly following the final gelatinization.

The level to which the starch is degraded, the degree to which it is etherified, and the amount of boric acid added are interdependent variables. The degradation of the starch may be carried out to fluidity levels within the range of about 40 to about 90 (intrinsic viscosity of about 0.90 to about 0.35). The etherification should be controlled so as to produce a product with a degree of substitution within the range of approximately 0.02 to approximately 0.10. The amount of boric acid added is preferably within the range of about 3 to about 7 percent.

As mentioned above, the various steps of the process may be carried out in any order; i. e. the starch may be etherified to the desired degree and then degraded and gelatinized, or then gelatinized and degraded, or the starch may be first gelatinized and then subjected to the degradation and etherification.

Furthermore, as also mentioned above, the degradation may be carried out by any suitable method and the etherification may likewise be accomplished by any convenient procedure. Various methods for achieving both of these ends are well known in the art.

The following examples, which are intended as typical and informative only, and not in a limiting sense, will further illustrate the process of this invention: (Methods used to characterize the products obtained will be described hereinafter).

*Example 1*

Corn starch was treated with $H_2SO_4$ in aqueous slurry (20 Bé.) at 125° F. until a portion of the reaction mixture when adjusted to pH 5.0 with sodium carbonate, filtered, and washed showed a fluidity of 75 and an intrinsic viscosity $[\eta]$ of 0.50 by procedures hereinafter described.

The main portion of the starch was then neutralized, filtered and washed. Water was then added to the starch in a ratio of 162 grams, dry basis starch, to 230 ml. of water. Then, to this slurry was added with stirring, for every 162 grams of starch (1 molar weight), 0.17 mole of sodium chloride (or approximately 10 grams) and 0.05 mole of sodium hydroxide (or 2.0 grams). The slurry was then transferred to a closed reactor provided with a stirrer and an inlet for introducing reagents. To this slurry at 125° F., approximately 0.1 mole (or 4.4 grams) of ethylene oxide as a cooled liquid was introduced for each molar weight of starch. At the end of 6 hours, hydrochloric acid was introduced to adjust the pH to 6.5 and the slurry was filtered and washed. It was found by procedures hereinafter described, that the starch had been etherified to a degree of substitution (D. S.) of 0.073 hydroxyethyl groups per glucose group in the starch.

The starch was then made into a slurry with water, 5 percent of boric acid (based on weight of starch) was added, and gelatinization of the starch was completed in a "Votator" at 195° F. The paste was then led through a pipe, heated externally by water at 190° F., directly to the valley between two heated rolls. These were 2 feet in diameter, rotating at 3.3 R. P. M. and heated with steam at 100 p. s. i. The resulting dried starch flake was then ground and passed over screens. All particles unable to pass a No. 35 mesh screen and all fine particles passing No. 120 mesh were rejected.

This product had an excellent dispersibility rating in cold water, i. e. 10 seconds, and when fabrics were treated with this prepared starch size, no starch streaks were left on fabric and very little tendency to water spot was noted when the dried goods were sprinkled with water. After ironing the fabric, the starch was found to have imparted a smooth, flexible finish and a satisfactory stiffening of the goods. It was found by examination of a portion of the starch size that 99.4 percent of the starch substance had dissolved during preparation of the size.

*Example 2*

The procedures given in Example 1 were repeated essentially as described with the exception that etherification was extended until the starch showed on analysis a D. S. of 0.089. The final product was substantially 100 percent soluble in cold water. Its dispersibility rating was 20 seconds, and again equally good performance was noted in sizing. Water spotting was only faintly discernible.

*Example 3*

The procedures given in Example 1 were repeated essentially as described with the exception that etherification with ethylene oxide was limited (by limiting the time to 5 hours) so as to produce a D. S. of 0.064. The final product was in all ways comparable to the product of Example 1.

*Example 4*

The procedures given in Example 1 were repeated with the exception that derivatization was limited so that starch ether of only 0.024 D. S. was produced in the derivatization step.

This product had a slightly less dispersibility rating in cold water (80 seconds) and proved to be only 83.0 percent soluble, indicating that for an acid modified starch of 75 fluidity, slight more derivatization than 0.024 D. S. is required to produce rapid dispersibility and very high solubility in cold water. Water spotting effects were, however, negligible.

*Example 5*

The procedures in Example 1 were repeated essentially as given with the exception that premodification of the starch with acid was arrested when the starch showed a fluidity of 60 and intrinsic viscosity of 0.60 by procedures given hereinafter. Etherification of the starch with ethylene oxide was carried out to a value of 0.061 D. S. The product exhibited freedom from water spotting and solubility thereof was 92.6 percent in cold water. The dispersibility rating was 100 seconds.

*Example 6*

The procedures given in Example 1 were repeated with the exception that the starch was modified with acid only to the level of 40 fluidity and intrinsic viscosity of 0.90. Etherification with ethylene oxide was carried out to the level of 0.061 D. S. Dispersibility in cold water was fair, i. e. 120 seconds, and water spotting was negligible but only 81.1 percent of the product dissolved in cold water. Thus, apparently a lower limit was reached in the fluidity (and intrinsic viscosity) to which a starch may be modified with acid in order to make an etherified starch of about 0.06 D. S. which is both quickly dispersible and highly soluble in cold water.

This conclusion was confirmed operating with a 20 fluidity starch etherified to 0.068 D. S. with ethylene oxide. Dispersibility rating in cold water was poor, i. e. in 300 seconds, and solubility only 69.7 percent.

*Example 7*

Corn starch was etherified with ethylene oxide by procedures given in Example 1, but arresting the reaction when the D. S. was approximately 0.02. This product was made into slurry with water at about 35 percent solids concentration and to this, 5 percent of boric acid based on starch was added, and the pH adjusted to 6.9. Then 0.1 percent calcium chloride and 0.45 percent of a commercial alpha-amylase preparation, "Rhozyme DX" (Rohm and Haas), all based on weight of starch, were finally stirred in. This slurry was passed through a "Votator" at 195° F. and held in converting coils at 190° F. for 30 minutes, during which time the intrinsic viscosity of the starch dropped to a level of 0.60. The starch was passed immediately to the valley of heated double rolls and finished as a dry powder, as described in Example 1.

The product had a dispersibility rating in cold water of 50 seconds, 92 percent of the solids dissolved and water spotting was negligible.

*Example 8*

The procedures given in Example 7 were repeated with the exception that the etherification step was extended until a D. S. of 0.080 was obtained. This partial ether required less enzyme, 0.30 percent based on starch, to convert to a level so that the intrinsic viscosity was 0.60. The final product had a dispersibility rating in cold water of 20 seconds and 94.1 percent dissolved.

*Example 9*

Corn starch was etherified with propylene oxide as follows: For each 162 grams, dry basis starch, in a closed reactor, provided with an efficient agitator and inlet of chemicals, 20 ml. of water containing 0.2 gram of "Tween 20" (a wetting agent sold by Atlas Powder Company) was added, followed by 1.8 grams (as a 50 percent aqueous solution) of triethanolamine. Then 5.8 grams (0.1 mole) of propylene oxide was added over a period of 10 minutes while stirring the starch. The starch was heated to 50–60° C. and maintained at this temperature for 6 hours. A partial vacuum was applied to the reactor, the temperature raised to 80–100° C. and a very small stream of air was pulled through the reactor for 30 minutes. The starch was then cooled and emptied from the reactor. The D. S. was 0.030.

The starch was suspended in water at a concentration of 35 percent of solids and 5 percent of boric acid was added following which the pH was adjusted to 6.9 with HCl. Then 0.1 percent calcium chloride and 0.6 percent of "Rhozyme DX," based on weight of the starch, were added and the starch was converted, as in Examples 7 and 8, to the level of 0.35 intrinsic viscosity and dried. The final starch dispersed rapidly in water (within 30 seconds) and had a satisfactory water spot rating.

*Example 10*

Seventy-five fluidity starch was etherified with propylene oxide, as in Example 9. The D. S. was 0.042. Then the partially etherified starch was made into a slurry with water, the pH adjusted to 6.8 with HCl and 5 percent of boric acid added. After the gelatinization and roll drying operation, the final product had a dispersibility rating in cold water of 15 seconds and showed no water spotting whatsoever.

*Example 11*

Forty fluidity starch was etherified with ethylene oxide, as in Example 6, but using sufficient oxide so as to obtain a D. S. of 0.108. Nevertheless, when a portion of this batch as an aqueous slurry was roll-dried, the dispersibility rating of the product in water at 65° F. was 250 seconds; solubility was 77.7 percent.

Another portion of the batch to which 3 percent of boric acid (based on starch) was added, was gelatinized and dried on rolls. The dispersibility rating in water at 65° F. was fair (100 seconds); solubility was 83.7 percent.

A third portion of the batch to which 5 percent of boric acid (based on starch) was added, was gelatinized and dried on rolls. The dispersibility rating in water at 65° F. was 50 seconds; solubility was 87.5 percent.

All three products showed negligible water spotting.

Amounts of boric acid as high as 7 percent have been used to obtain good cold water dispersibility of a 75-fluidity, 0.024 D. S. hydroxyethyl starch which otherwise produced sizes showing negligible water spotting but poor dispersibility.

*Example 12*

Corn starch was made into a slurry with water at 75° F. and treated with sodium hypochlorite (approximately 2 percent available chlorine, based on weight of starch). After 18 hours the intrinsic viscosity had decreased to 0.60. This starch was filtered and washed and then treated with ethylene oxide as in Example 1. The D. S. was 0.079. After gelatinizing and roll drying in the presence of 5 percent of boric acid, the final product dispersed in cold water in 20 seconds, was soluble to the extent of 96.4 percent and freedom from water spotting was satisfactory.

The methods used in testing the products produced according to this invention will now be described.

Fluidity of starch was determined by dissolving 5 grams of the product in 100 ml. of 1 percent sodium hydroxide and noting the number of milliliters which will pass a standard orifice in 70 seconds at 25° C. as described on page 133 of the second edition (1950) of "Chemistry and Industry of Starch" by R. W. Kerr.

Intrinsic viscosity was determined as described on page 675 of the second edition (1950) of "Chemistry and Industry of Starch" by R. W. Kerr.

The D. S., or degree of substitution, of hydroxyethyl and hydroxypropyl starch ethers was determined essentially according to the method of P. W. Morgan, "Analytical Chemistry," 18, 500 (1946). In this method, the hydroxyalkoxy group is hydrolyzed and decomposed with hydriodic acid in the presence of phenol and propionic anhydride. This reaction yields stoichiometric quantities of the alkyl iodide and olefin. These products are measured quantitatively by absorption in alcoholic solution of silver nitrate and an acetic acid solution of bromine, respectively.

Cold water dispersibility measurements are made as follows: A specially constructed funnel, either of glass or metal, capable of holding 500 ml. of aqueous liquid and to which is attached a screen 1.75 sq. cm. in area and having 70 meshes to the inch is required in this determination.

Twenty grams of the starch to be tested are weighed on a torsion balance and added to 400 ml. of water at a temperature of 77° F. (25° C.) in a liter beaker. The dispersion is agitated with a four finger breaker-type agitator revolving at 280 R. P. M. The starch product is dispersed for exactly 45 seconds.

At the end of the time interval, the dispersion is rapidly transferred to the funnel described, which is supported over a 500 ml. graduate. The time required for a given volume of the dispersion to pass through the funnel is considered the dispersibility rating. The less time required to collect a definite volume of filtrate the better is the rating of the product.

By this procedure ratings are as follows:

Excellent=15 seconds or less for 400 ml.
Good=15–60 seconds for 400 ml.
Fair=60–120 seconds for 400 ml.
Poor=more than 120 seconds for 400 ml.

Cold water solubility determinations are made as follows: Weigh accurately a 2 gram sample of the starch to be tested and transfer it carefully to a dry 200 ml. centrifuge bottle. Add exactly 99 ml. of distilled water and shake vigorously as soon as the water comes into contact with the starch. Stopper the bottle and shake mechanically for 15 minutes. Centrifuge the bottle containing the sample for 15 minutes at approximately 2000 R. P. M. Pipet accurately a 25 ml. aliquot of the supernatant solution into a dry, tarred nickel or silica dish. Evaporate the sample to dryness on a steam bath or in an air oven at 100° C. Complete drying by placing the sample in a vacuum oven at 105° C. for 4 hours. Remove sample from oven, cool in desiccator and weigh. Calculation:

$$\text{Percent soluble (d. b.)} = \frac{\text{Residue weight} \times 400}{\text{Sample weight (2 g.)} \times \text{d. s.}}$$

I claim:

1. Process for the production of a cold water dispersible, cold water soluble starch product comprising subjecting starch to treatment by the following three steps in any order: (a) degrading the starch to a fluidity level within the range of about 40 to about 90, (b) etherifying said starch with a lower alkylene oxide in contact with a catalyst to etherify the same to a degree of substitution within the range of about 0.02 to about 0.1, and (c) completely gelatinizing said starch; adding to the thus treated starch about 3 to about 7 percent of boric acid, based on the weight of the starch, and then rapidly drying the starch.

2. Process according to claim 1 wherein residual etherifying agent, catalyst, and by-products resulting therefrom are removed after the etherifying treatment.

3. Process according to claim 1 wherein said alkylene oxide is ethylene oxide.

4. Process according to claim 1 wherein said alkylene oxide is propylene oxide.

5. Process according to claim 1 wherein acid hydrolysis is employed to degrade the starch.

6. Process according to claim 1 wherein enzyme hydrolysis is employed to degrade the starch.

7. Process according to claim 1 wherein oxidation is employed to degrade the starch.

8. Process for the production of a cold water dispersible starch product, comprising subjecting starch to acid hydrolysis to degrade the same to a fluidity level of about 40 to about 80, etherifying said starch with ethylene oxide to a degree of substitution within the range of about 0.02 to about 0.1, slurrying the thus treated starch in water containing about 5 percent of boric acid, based on the weight of the starch, completely gelatinizing said slurry, and drying the same on heated rolls.

9. Process for the production of a cold water dispersible starch product, comprising etherifying starch with a lower alkylene oxide to a degree of substitution within the range of about 0.02 to about 0.1, slurrying said starch in water containing from about 3 to about 7 percent of boric acid, based on the weight of the starch, adjusting the pH of said slurry to approximately 7, adding to said slurry about 0.1 percent calcium chloride and an amount of an alpha-amylase within the range of about 0.3 to about 0.7 percent, based on the weight of the starch, completely gelatinizing said slurry, degrading the starch by means of said enzyme to an intrinsic viscosity within the range of about 0.3 to about 0.6, immediately drying the treated starch on heated rolls, and grinding the dried product.

10. Process according to claim 9 wherein said alkylene oxide is ethylene oxide.

11. Process according to claim 9 wherein said alkylene oxide is propylene oxide.

12. Process for the production of a cold water dispersible starch product, comprising treating starch to degrade the same to a fluidity level of about 75, etherifying said starch with propylene oxide to a degree of substitution of about 0.04, slurrying the etherified starch in water, adjusting the pH of said slurry to about 7, adding approximately 5 percent of boric acid, based on the weight of the starch, to said slurry, completely gelatinizing said starch, and drying the treated starch on heated rolls.

13. Process for the production of a cold water dispersible starch product, comprising treating starch with sodium hypochlorite to degrade the same to an intrinsic viscosity of about 0.6, etherifying the degraded starch with ethylene oxide to a degree of substitution of about 0.08, adding approximately 5 percent of boric acid, based on the weight of the starch, to the treated starch, gelatinizing said treated starch, and drying the same on heated rolls.

14. Process according to claim 1 wherein said starch is corn starch.

15. Cold water dispersible, cold water soluble starch in dry form consisting essentially of a completely gelatinized lower alkyl starch ether with a degree of substitution within the range of about 0.02 to about 0.1 and degraded to a fluidity level within the range of about 40 to about 90.

16. Cold water dispersible, cold water soluble starch in dry form consisting substantially entirely of a completely gelatinized, thin boiling lower alkyl starch ether with a degree of substitution within the range of about 0.02 to about 0.1, dried in contact with about 3 to about 7 percent of boric acid.

17. Cold water dispersible, cold water soluble starch in dry form consisting substantially entirely of a completely gelatinized enzyme converted lower alkyl starch ether with a degree of substitution within the range of about 0.02 to about 0.1, dried in contact with about 3 to about 7 percent of boric acid.

18. Process according to claim 3 wherein said starch is corn starch.

19. Process according to claim 4 wherein said starch is corn starch.

20. Process according to claim 5 wherein said starch is corn starch.

21. Process according to claim 6 wherein said starch is corn starch.

22. Process according to claim 7 wherein said starch is corn starch.

(References on following page)

References Cited in the file of this patent

UNITED STATES PATENTS

| Number | Name | Date |
|---|---|---|
| 1,020,655 | Perkins | Mar. 19, 1912 |
| 1,257,307 | Bloede | Feb. 26, 1918 |
| 2,174,760 | Scheutta | Oct. 3, 1939 |
| 2,424,050 | Pecker et al. | July 15, 1947 |
| 2,541,773 | Lokema et al. | Feb. 13, 1951 |
| 2,559,043 | Nestor | July 3, 1951 |
| 2,609,326 | Rigman et al. | Sept. 2, 1952 |

FOREIGN PATENTS

| Number | Country | Date |
|---|---|---|
| 179,765 | Great Britain | May 18, 1922 |
| 188,992 | Great Britain | Nov. 23, 1922 |
| 412,377 | France | July 11, 1910 |
| 701,868 | France | Mar. 24, 1931 |